(12) United States Patent
Zhang et al.

(10) Patent No.: US 10,727,480 B2
(45) Date of Patent: Jul. 28, 2020

(54) SULFUR COMPOSITE CATHODE MATERIAL AND PREPARATION METHOD AND APPLICATION THEREOF

(71) Applicant: SUN YAT-SEN UNIVERSITY, Guangzhou (CN)

(72) Inventors: Zishou Zhang, Guangzhou (CN); Kancheng Mai, Guangzhou (CN); Xuliang Fan, Guangzhou (CN); Geng Cheng, Guangzhou (CN); Yangfan Zhang, Guangzhou (CN)

(73) Assignee: Sun Yat-Sen University, Guangzhou (CN)

( * ) Notice: Subject to any disclaimer, the term of this patent is extended or adjusted under 35 U.S.C. 154(b) by 17 days.

(21) Appl. No.: 16/026,327

(22) Filed: Jul. 3, 2018

(65) Prior Publication Data

US 2019/0148716 A1 May 16, 2019

(30) Foreign Application Priority Data

Nov. 10, 2017 (CN) .......................... 2017 1 1105924

(51) Int. Cl.

| H01M 4/36 | (2006.01) |
|---|---|
| H01M 4/38 | (2006.01) |
| H01M 4/62 | (2006.01) |
| H01M 10/052 | (2010.01) |
| H01M 4/13 | (2010.01) |
| H01M 4/139 | (2010.01) |

(Continued)

(52) U.S. Cl.
CPC ............ *H01M 4/364* (2013.01); *H01M 4/13* (2013.01); *H01M 4/139* (2013.01); *H01M 4/366* (2013.01); *H01M 4/38* (2013.01); *H01M 4/587* (2013.01); *H01M 4/625* (2013.01); *H01M 10/052* (2013.01); *H01M 2004/028* (2013.01)

(58) Field of Classification Search
CPC ........ H01M 4/364; H01M 4/13; H01M 4/139; H01M 4/366; H01M 4/38; H01M 4/587; H01M 4/625; H01M 10/052
See application file for complete search history.

(56) References Cited

U.S. PATENT DOCUMENTS

| 2015/0357634 | A1* | 12/2015 | Sun ....................... H01M 4/136 429/231.4 |
| 2017/0047581 | A1* | 2/2017 | Lu ....................... H01M 4/1391 |

* cited by examiner

*Primary Examiner* — Jimmy Vo
(74) *Attorney, Agent, or Firm* — Thorpe North & Western, LLP

(57) ABSTRACT

A sulfur composite cathode material and a preparation method thereof. After a sulfur-containing suspension is mixed with a host material, the isolated sulfur of large particles is transformed into a uniform sulfur coating on the surface of the host material through the "solid-liquid-solid" phase transition process of elemental sulfur. The organic solvent is removed to obtain a sulfur composite cathode material; and the host material comprises a carbon material. By utilizing the dissolving-precipitating balance of the elemental sulfur in the selected organic solvent, through the strong interaction between the carbon material and the elemental sulfur dissolved in the organic solvent, the sulfur dissolved in the solution is continuously deposited on the surface of the host material, and the undissolved sulfur particles is continuously dissolved in the organic solvent, and then continuously deposited on the surface of the sulfur-carrying material, so as to obtain a uniform sulfur composite cathode material.

13 Claims, 10 Drawing Sheets

(51) Int. Cl.
*H01M 4/587* (2010.01)
*H01M 4/02* (2006.01)

SULFUR COMPOSITE CATHODE MATERIAL AND PREPARATION METHOD AND APPLICATION THEREOF

PRIORITY

This application claims priority to Chinese application number 201711105924.8, filed Nov. 10, 2017, with a title of SULFUR-CARRYING COMPOSITE CATHODE MATERIAL AND PREPARATION METHOD AND APPLICATION THEREOF, which is hereby incorporated herein by reference in its entirety.

TECHNICAL FIELD

The present invention pertains to the technical field of lithium-sulfur batteries, and in particular relates to the preparation method and application of sulfur composite cathode material.

BACKGROUND

With the development of society and the increasingly popularization of electronic products, people's demand for an energy storage device is becoming higher and higher, and thus currently it is a key problem to improve the energy density, prolong the service life and reduce the material production cost of the energy storage device.

Currently, the cathode materials of commercial lithium-ion batteries mainly include a series of lithium-containing transition metal oxides such as lithium manganate, lithium cobaltate, and lithium iron phosphate. However, the specific capacities of those materials are less than 300 mAh·g$^{-1}$ which limit the power storage capacity of those materials seriously. As an active ingredient of a lithium-sulfur battery in a new energy storage system, the theoretical specific capacity of elemental sulfur can be up to 1675 mAh·g$^{-1}$. But since the elemental sulfur is an insulator, it is necessary to complexing the elemental sulfur with a highly conductive substance to meet the requirements of electric conduction. Furthermore, an intermediate product polysulfide formed during the charge and discharge of a sulfur-containing electrode can dissolve in an electrolyte and migrate to a negative electrode under the action of a concentration gradient to cause an irreversible loss of sulfur, thereby finally resulting in a sharp drop of the power storage performance of the sulfur-containing electrode.

In order to improving the electrochemical performance of the sulfur, various hierarchical structured conductive materials have been thoroughly explored to host sulfur in current studies. Common methods for complexing the elemental sulfur with a porous host material mainly include melt infiltration, in-situ electro-deposition and chemical deposition, which are cumbersome in the preparation process and restrict the industrial development of the lithium-sulfur battery. For example, in the fabrication process of melt infiltration method, the elemental sulfur and porous host material should be premixed by means of grinding and heated in a sealed container at 150-160° C. under the protection of an inert atmosphere for 12-24 hours. After the temperature return to room temperature, sulfur composite cathode material is obtained. However, it is difficult for this method to achieve the requirements of industrialization due to its complicated procedures, high energy consumption, and long time period.

SUMMARY

In view of this, an objective of the present invention is to provide the preparation method and application of sulfur composite cathode material. The method provided by the present invention is simple and can prepare a sulfur composite cathode material.

To achieve the above purpose, the present invention provides the following technical solutions:

The present invention provides a method for preparing a sulfur composite cathode material, including the following steps:

(1) mixing an elemental sulfur with an organic solvent to obtain a sulfur-containing suspension, where the sulfur-containing suspension includes a saturated solution of sulfur and undissolved elemental sulfur; and (2) mixing the sulfur-containing suspension obtained in step (1) with the host material, and removing an organic solvent, to obtain a sulfur composite cathode material. The time of mixing the sulfur-containing suspension and the host material depends on a criterion that there is no obvious undissolved elemental sulfur in the mixing system;

the host material includes a series of carbon materials; and the mass ratio of the elemental sulfur used in step (1) for formulating the sulfur-containing suspension to the host material in step (2) is (10-85):(15-90).

Preferably, the method further includes adding an oxygen-containing functional polymer material when the sulfur-containing suspension and the host material are mixed in step (2).

Preferably, the carbon material includes one or more of carbon nanotube, graphene, porous carbon, carbon black, and carbon fiber.

Preferably, the mass ratio of the elemental sulfur to the organic solvent in step (1) is 1:(10-300).

Preferably, the elemental sulfur includes one or more of rhombic sulfur, orthogonal sulfur, amorphous sulfur, sublimed sulfur, and nano-sulfur.

Preferably, the organic solvent includes one or more of ethanol, diethyl ether, acetone, tetrahydrofuran, xylene, ethyl acetate, N,N-dimethylformamide, and dimethyl sulfoxide.

Preferably, the time of mixing the sulfur-containing suspension and the host material in step (2) is 5-30 min; and the manner of mixing the sulfur-containing suspension and the host material in step (2) is ball milling, ultrasonic dispersion, mechanical stirring, or mechanical stirring under an ultrasonic condition.

Preferably, the manner of removing organic solvent in step (2) is volatilization at room temperature, volatilization by heating, filtration or vacuum filtration.

The present invention provides a sulfur composite cathode material obtained by the preparation method of the foregoing technical solution, by mass percentage including 15-90% of the host material and 10-85% of the elemental sulfur coated on the surface of host material.

The present invention further provides an application of the sulfur composite cathode material obtained by the above technical solution as a cathode material for lithium-sulfur battery.

The present invention provides a method for preparing a sulfur composite cathode material, including the following steps: mixing elemental sulfur with an organic solvent to obtain a sulfur-containing suspension, where the sulfur-containing suspension includes a saturated solution of sulfur and undissolved elemental sulfur particles; then mixing the resultant sulfur-containing suspension with host material, and then removing an organic solvent to obtain a sulfur composite cathode material. The time of mixing the sulfur-containing suspension and the host material depends on a criterion that there is no undissolved elemental sulfur in the mixing system. The host material includes carbon material which facilitates the conduction of electron. The mass ratio of the elemental sulfur to the host material is (10-85):(15-90).

The method provided by the present invention has a simple preparation process and is easy to operate. Based on a "solid-liquid-solid" evolution of sulfur in organic solvent, sulfur morphology changes from initial big particles to the final coating on surface of host material. In this process, owing to the strong interaction between $S_8$ molecule and host material, $S_8$ molecule could be adsorbed and stabilized on host material which acts as crystal nucleus for crystallization of sulfur. The crystallization of sulfur broke the dissolution-precipitation equilibrium of sulfur in organic solvent. To keep the dissolution-precipitation equilibrium of sulfur, residual sulfur particles stay dissolving. The simultaneous crystallization and dissolution of sulfur drive the sulfur transition from solid phase to liquid phase, finally to solid phase, which leaded to coating of sulfur on host material. The results of the embodiments show that the preparation method provided by the present invention can effectively replace a traditional method for preparing a sulfur-carrying composite cathode material.

BRIEF DESCRIPTION OF DRAWINGS

The present invention will be further described in detail with reference to the accompanying drawings and specific embodiments.

DETAILED DESCRIPTION

Figure 1:
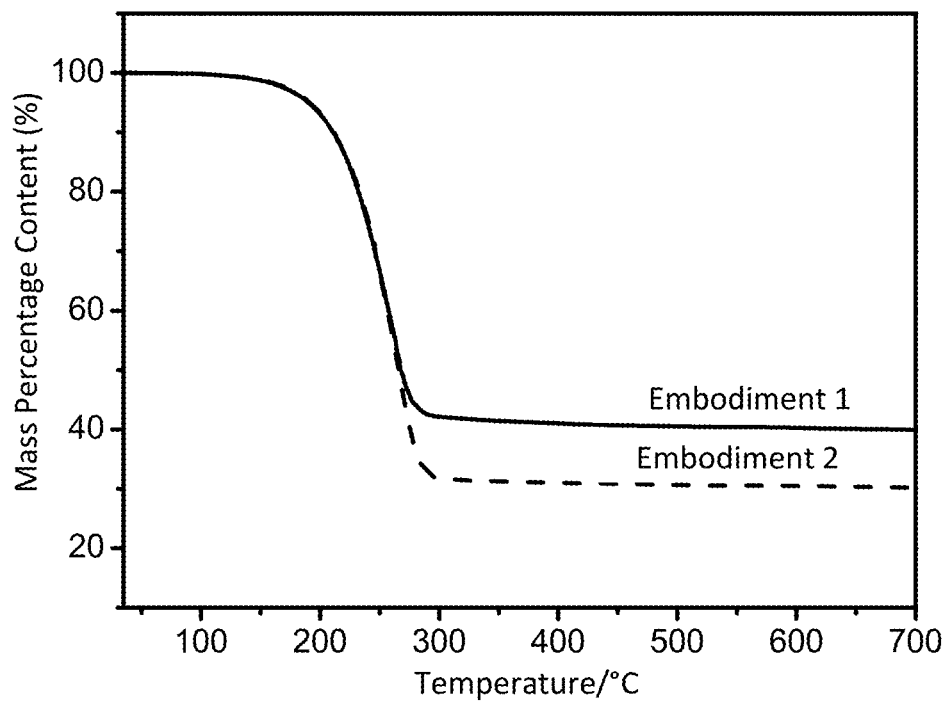
FIG. 1 is an SEM image of the flexible sulfur composite film prepared in Embodiment 1 of the present invention.

The present invention provides a method for preparing sulfur composite cathode materials, including the following steps:

(1) mixing an elemental sulfur with an organic solvent to obtain a sulfur-containing suspension, where the sulfur-containing suspension includes a saturated solution of sulfur and undissolved elemental sulfur;

(2) mixing the sulfur-containing suspension obtained in step (1) with the host material, and removing an organic solvent, to obtain a sulfur composite cathode material. The time of mixing the sulfur-containing suspension and the host material depends on a criterion that there is no obvious undissolved elemental sulfur in the mixing system;

the host material includes a carbon material; and the mass ratio of the elemental sulfur used in step (1) for formulating the sulfur-containing suspension to the host material in step (2) is (10-85):(15-90).

In the present invention, the elemental sulfur is mixed with the organic solvent to obtain the sulfur-containing suspension. In the present invention, the elemental sulfur preferably includes one or more of rhombic sulfur, orthogonal sulfur, amorphous sulfur, sublimed sulfur, and nano-sulfur. In the present invention, the organic solvent preferably includes one or more of ethanol, diethyl ether, acetone, tetrahydrofuran, xylene, ethyl acetate, N,N-dimethylformamide, and dimethyl sulfoxide. The present invention has no special requirements on the specific source of the elemental sulfur and the organic solvent. They are commercially available products that are well known to those skilled in the art.

In the present invention, the mass ratio of the elemental sulfur to the organic solvent is preferably 1:(10-300), further preferably 1:(50-250), and more preferably 1:(100-150). The present invention has no special requirements on the mixing temperature of the elemental sulfur and the organic solvent, and they can be mixed at any temperature. In the present invention, the mixing is preferably conducted under an ultrasound condition, and the ultrasonic frequency is preferably 40-60 kHz, and further preferably 50 kHz.

In the present invention, the mixing results in a sulfur-containing suspension, and the sulfur-containing suspension includes the saturated solution of sulfur and the undissolved elemental sulfur particles. In the present invention, the elemental sulfur dissolved in the organic solvent is preferably 20% or less, and further preferably 10%-15% of the total mass of the elemental sulfur dissolved and undissolved in the organic solvent. In the sulfur-containing suspension the elemental sulfur dissolved and undissolved reach a dissolution-precipitation equilibrium state and the host material adsorbs the sulfur molecule dissolved in the organic solvent.

In the present invention, after the sulfur-containing suspension is obtained, the resultant sulfur-containing suspension is mixed with a host material, and then the organic solvent is removed to obtain the sulfur composite cathode material.

In the present invention, the mass ratio of the elemental sulfur used for formulating the sulfur-containing suspension to the host material is (10-85):(15-90), preferably (30-70):(30-70), further preferably (45-55):(45-55), and more preferably 50:50.

In the present invention, the host material includes the carbon material. In the present invention, the carbon material is preferably one or more of carbon nanotube, graphene, activated carbon, porous carbon, carbon black and carbon fiber. There are no special requirements on the specific sources of the carbon nanotube, graphene, porous carbon, carbon black, and carbon fiber. These carbon materials are commercial products well known to those skilled in the art can be used. In the present invention, the carbon black is specifically acetylene black.

In the present invention, the host material is adopted to achieve an effective adsorption of the elemental sulfur, the elemental sulfur in a solid phase is converted into a liquid phase by dissolving in the organic solvent, and the dissolved elemental sulfur is redeposited onto the surface of the host material.

Based on the above "solid-liquid-solid" phase transition process of the elemental sulfur in the solvent, the isolated large sulfur particles are transformed into a uniform sulfur coating on the surface of the host material which facilitates the electron transport from host material to sulfur. Meanwhile, the migration of polysulfide could be restricted due to the interaction between sulfur and host material and sulfur composite shows a good cycle stability as the cathode of lithium sulfur battery. Furthermore, the sulfur/carbon composites are beneficial for large-scale application owing to the wide range of sources, mature preparation process and low cost of carbon material.

In the present invention, the approaches of mixing the sulfur-containing suspension and host material are ball milling, ultrasonic dispersion, mechanical stirring, or mechanical stirring under an ultrasonic condition. In the present invention, the ball milling rate is preferably 250-400 r/min, and further preferably 300-350 r/min. In the present invention, the frequency of the ultrasonic dispersion is preferably 40-60 kHz, and further preferably 50 kHz. In the present invention, the rotation rate of the mechanical stirring is preferably 300-600 r/min. In the present invention, the mixing of the sulfur-containing suspension and the host material preferably includes the dispersion of host material in the sulfur-containing suspension to facilitate the contact between the host material and the sulfur molecule dissolved in the sulfur-containing suspension, thereby improving the adsorption of the dissolved elemental sulfur by the host material.

In the present invention, the adsorption between the host material and the dissolved elemental sulfur occurs during the mixing process of the sulfur-containing suspension and the host material. The elemental sulfur dissolved in the organic solvent of the present invention exists in the form of a $S_8$ molecule, and the elemental sulfur is deposited on the surface of the host material due to the strong interaction between the host material and the dissolved elemental sulfur. The surface energy of the host material is reduced after $S_8$ is adsorbed on the surface of the host material, and the surface energy of the $S_8$ adsorbed on the surface of the host material is relatively higher. Owing to the high surface energy, $S_8$ molecule continuously deposited and formed a uniform sulfur coating on the surface of the host material. As the $S_8$ molecule is continuously adsorbed by the host material, the concentration of the sulfur dissolved in the organic solvent is continuously reduced. The unsaturation degree of the solution drives rapid dissolution of the originally undissolved elemental sulfur particles. With the dissolution-recrystallization balance of sulfur in the organic solvent, the large sulfur particles are transformed into a uniform sulfur coating on the surface of the host material.

In the present invention, the time of mixing the sulfur-containing suspension and host material depends on a criterion that there is no obvious undissolved elemental sulfur in the mixing system. In other words, the disappearance of undissolved elemental sulfur particles indicated the complete mixture of the sulfur-containing suspension and the host material. In the present invention, the mixing time is preferably 5-30 min, further preferably 10-25 min, and more preferably 15-20 min.

In the present invention, the method preferably includes the addition of oxygen-containing functional polymer material during the fabrication process of sulfur composite. The mass of the oxygen-containing functional polymer material is preferably 0-30%, further preferably 10-25%, and more preferably 15-20% of the mass of the host material. In the present invention, the oxygen-containing functional polymer material is preferably polyvinyl acetate or polyacrylic acid. In the present invention, the molecular weight of the oxygen-containing functional polymer material is preferably 100,000-500,000, further preferably 150,000-400,000, and more preferably 200,000 to 300,000. The present invention has no special requirements on the specific sources of the polyvinyl acetate and the polyacrylic acid. Both of them are commercial products known to those skilled in the art can be used. In the present invention, the oxygen-containing functional polymer material is used as an additive to suppress the shuttling of polysulfide during the charge-discharge process and enhance the cycling stability of electrode due to the strong interaction between the oxygen-containing functional group and the polysulfide. Carbon nanotube and graphene could be used as the framework to fabricate the flexible sulfur composite film and the addition of polymer material can further improve the mechanical properties of the flexible film.

When the oxygen-containing functional polymer material is added, the sulfur-containing suspension, the host material, and the oxygen-containing functional polymer material are mixed together; during the process of mixing the sulfur-containing suspension and the host material, the $S_8$ molecule which is continuously dissolved in the organic solvent is adsorbed onto the host material in the form of sulfur coating, and the oxygen-containing functional polymer material is coated on the host material and the surface of the sulfur coating of the host material.

In the present invention the organic solvent is removed from the mixed liquor after the mixing is completed, to obtain a sulfur composite cathode material. In the present invention, the removal approach of the organic solvent is preferably natural volatilization, volatilization by heating, filtration or suction filtration.

When the organic solvent is removed from the mixed liquor via natural volatilization, the natural volatilization time is preferably 3-6 h, and further preferably 4 to 5 h. When the organic solvent is removed from the mixed liquor via volatilization by heating, the temperature of the volatilization by heating is preferably 40-60° C., and the time of the volatilization by heating is preferably 3-6 h, and further preferably 3.5-4.5 h. During the natural volatilization and volatilization by heating of the present invention, the elemental sulfur which is still dissolved in the organic solvent will be further precipitated and deposited on the surface of the host material.

When the organic solvent is removed from the mixed liquor via filtration, the filtering includes: filtering the mixed liquor to obtain a filter cake as the sulfur composite cathode material. The present invention has no special requirements for specific embodiments of the filtration, and a filtration approach that is well known to those skilled in the art can be used. The host material coated with a uniform sulfur coating is present in a precipitate form in the organic solvent and the filtration can achieve separation between the precipitate and the organic solvent. When the organic solvent is removed from the mixed liquor via suction filtration, the resultant precipitate is the sulfur composite cathode material. The present invention has no special requirements for specific embodiments of the suction filtration, and a suction filtration method that is well known to those skilled in the art can be used; and in the embodiments of the present invention, the suction filtration is completed by a circulating water type vacuum pump.

In the present invention, the removed organic solvent is preferably recovered to recycle the organic solvent and reduce the production cost. The present invention preferably adopts a tail gas condensation method to recover the organic solvent when the organic solvent is removed in the manner of natural volatilization or volatilization by heating; and the present invention preferably distill the filtrate to achieve the recovery of the organic solvent when the organic solvent is removed in the manner of filtration or suction filtration.

The present invention also provides a sulfur composite cathode material obtained by the preparation method described in the above technical solution, which by mass percentage content includes 15-90% of the host material and 10-85% of the elemental sulfur coated on the surface of the host material.

In the present invention, the mass percentage content of host material and element sulfur in the sulfur composite cathode material preferably includes 30 to 70% of the host material and 30-70% of the elemental sulfur carried on the surface of the host material, and further preferably includes 45-55% of the host material and 45-55% of the elemental sulfur carried on the surface of the host material, and more preferably 50% of the host material and 50% of the elemental sulfur carried on the surface of the host material.

In the present invention, the elemental sulfur in the sulfur composite material is preferably carried on the surface of the host material in the form of sulfur coating, and is connected by a Van Der Waal's force between the host material and the $S_8$ molecule.

With the addition of oxygen-containing functional polymer in the mixture process of sulfur-containing suspension and host material during preparation of the sulfur composite cathode material, the sulfur composite cathode material prepared by the present invention preferably includes the host material, oxygen-containing functional polymer material and elemental sulfur. In the present invention, the elemental sulfur is coated on the surface of the host material; and the oxygen-containing functional polymer material is coated on the surface of the host material and the surface of the sulfur coating. In the present invention, the mass ratio of the total mass of the host material and the oxygen-containing functional polymer material to the elemental sulfur in the sulfur composite cathode material is preferably (15-90):(10-85), further preferably (30-70):(30-70), more preferably (45-55):(45-55), and most preferably 50:50; and the mass of the oxygen-containing functional polymeric material is preferably 0-30%, further preferably 10-25%, and more preferably 15-20% of the mass of the host material.

In the present invention, when the host material in the sulfur composite cathode material is a carbon nanotube and/or a graphene, the sulfur composite could form a flexible sulfur composite film. The flexible property parameter of the sulfur composite film is preferably a fracture strength greater than 0.5 MPa, and the film can be freely bent.

The present invention provides the sulfur composite cathode material described in the above technical solution as the application for a cathode material of a lithium-sulfur battery.

In the present invention, the application preferably includes coating the sulfur composite cathode material on surface of a current collector to obtain the cathode of the lithium-sulfur battery; and further preferably mixing the sulfur composite cathode material with a binder to obtain a coating liquid; coating the coating liquid onto the current collector to obtain a coated body; and drying the coated body to obtain the cathode of the lithium-sulfur battery. In the present invention, the current collector is preferably an aluminum foil or a carbon cloth; the present invention has no special requirements on the size of the current collector, and the size of the current collector in the battery cathode known to those skilled in the art can be used. In the present invention, the coating amount of the sulfur composite cathode material is preferably 2-5 mg/cm$^2$, and further preferably 3-4 mg/cm$^2$, based on the coating amount of sulfur. The coating amount adopted by the present invention can achieve a balance between the area capacity (the amount of charges stored in a unit area) and the mass capacity (the amount of charges stored per unit mass of the base material), such that the electrode not only has a relatively higher mass specific capacitance, but also has a relatively higher area capacitance, i.e., achieving optimum of the carrying amount and the utilization rate.

In the present invention, when the host material in the sulfur composite cathode material is one or more of the carbon nanotube, carbon fiber, and graphene, the application is preferably using the sulfur composite cathode material directly as the cathode of the lithium-sulfur battery. Since one or more of the carbon nanotube, carbon fiber, and graphene are used as the host material, the sulfur composite cathode material can form a thin film with a self-supporting structure through mutual entanglement between its own structures, and thus can be directly used as the cathode of the lithium-sulfur battery. In the present invention, the sulfur composite cathode material is preferably cut to the desired size of the battery cathode. When the host material in the sulfur composite cathode material is the carbon nanotube and/or the graphene, the sulfur composite cathode material is a flexible sulfur-carrying composite material, and is preferably directly used as a flexible cathode of the lithium-sulfur battery.

The sulfur composite cathode electrode material, the preparation method and application thereof as provided by the present invention will be described in detail in connection with the following embodiments, but they should not be construed as limiting the claimed scope of the present invention.

Embodiment 1

0.6 g of sublimed sulfur was ultrasonically dispersed in 150 mL of acetone at 40 kHz for 10 min to enable the dissolution-precipitation process of sulfur to reach an equilibrium state, so as to obtain a sulfur-containing suspension; 0.4 g of a multi-walled carbon nanotube (CNT) was then added into the sulfur-containing suspension, and the ultrasonic dispersion was continued for 30 min; and then the suspension was poured into a glass culture dish, and the solvent was volatilized completely in 300 min at room temperature to obtain a flexible composite thin film as the sulfur composite cathode film.

Embodiment 2

0.7 g of sublimed sulfur was ultrasonically dispersed in 150 mL of acetone at 40 kHz for 10 min to enable the dissolution-precipitation process of sulfur to reach an equilibrium state, so as to obtain a sulfur-containing suspension; 0.3 g of a multi-walled carbon nanotube (CNT) was then added into the sulfur-containing suspension, and the ultrasonic dispersion was continued for 30 min; and then the suspension was poured into a glass culture dish, and the solvent was volatilized completely in 300 min at room temperature to obtain a flexible composite thin film as the sulfur composite cathode film.

The microstructure of the flexible composite thin film prepared in Embodiment 1 was observed by using a Hitachi S-4800 cold field emission scanning electron microscope, and the result was shown in FIG. 1. As can be seen from FIG. 1, the multi-walled carbon nano tube self-weaved to form a porous conductive network skeleton, and there was no obvious isolated sulfur particle, indicating that the elemental sulfur uniformly adhered to the surface of the carbon nanotube.

Figure 2:
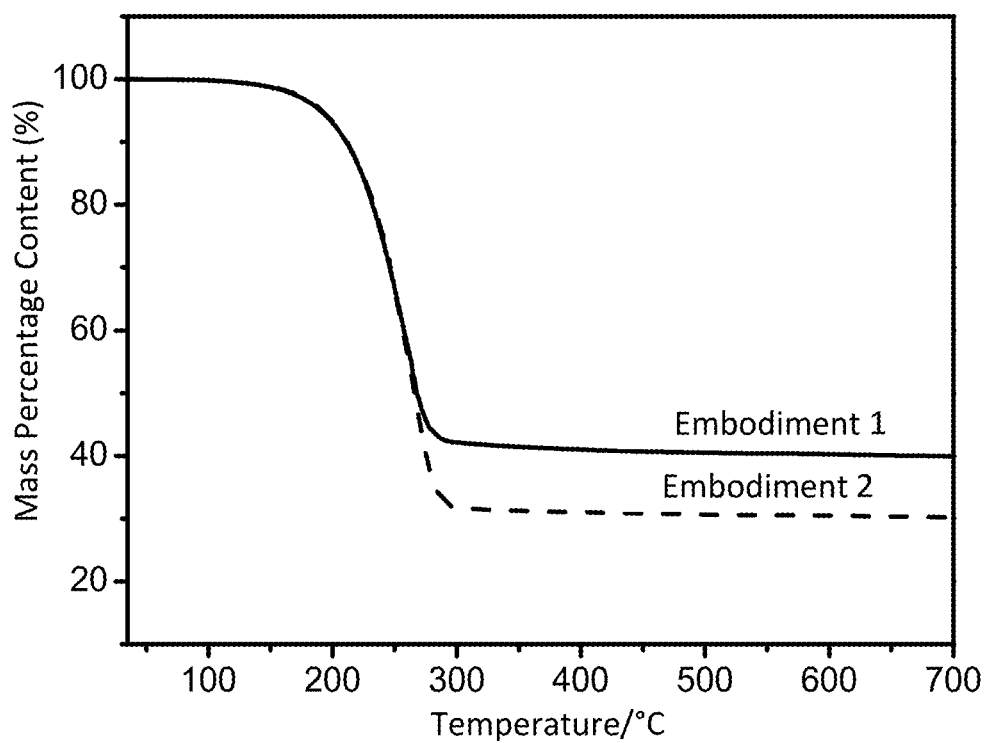
FIG. 2 shows a thermogravimetric curve of the flexible sulfur composite films prepared in Embodiments 1 and 2 of the present invention.

Thermogravimetric properties of the flexible composite thin films prepared in Embodiments 1 and 2 were analyzed and the results were shown in FIG. 2. As can be seen from FIG. 2, the mass percentage content of sulfur in the sulfur composite material prepared in Embodiment 1 was 60%, and the mass percentage content of the multi-walled carbon nanotube was 40%; the mass percentage content of sulfur in the sulfur composite material prepared in Embodiment 2 was 70%, and the mass percentage content of the multi-walled carbon nanotube was 30%. The thermogravimetric results were consistent with the ratio of raw materials added, indicating that there was no loss of sulfur in the preparation process. Through the method provided by the present invention, the sulfur content in the sulfur composite material could be precisely controlled, thereby avoiding weaken of the energy storage performance of the composite material as caused by the loss of sulfur.

Figure 3:
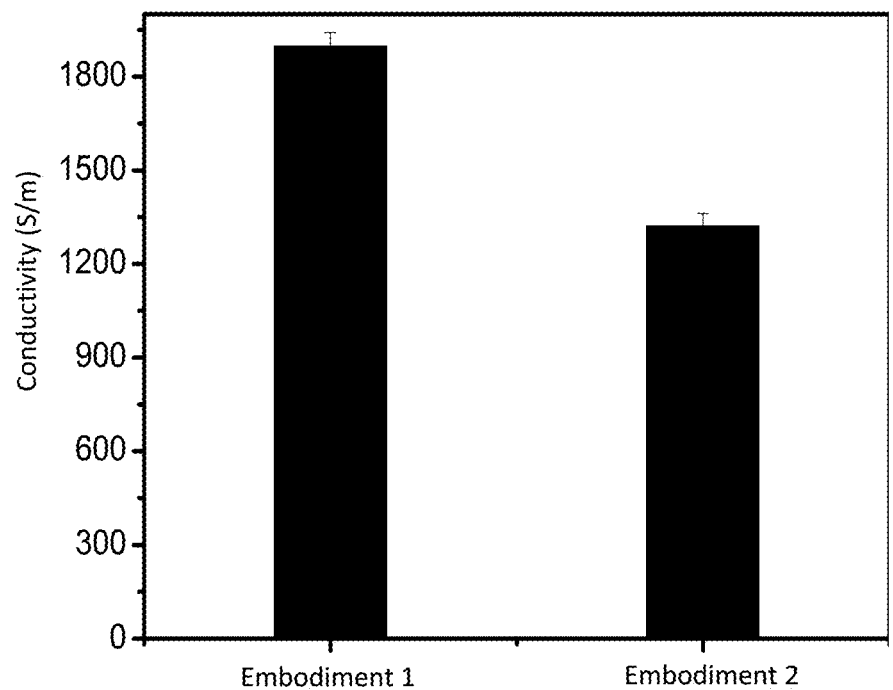
FIG. 3 is a conductivity histogram of the flexible sulfur composite films prepared in Embodiments 1 and 2 of the present invention.

The conductivities of the flexible composite thin film prepared in Embodiments 1 and 2 were tested using a four-probe resistivity tester, and the results were shown in FIG. 3. As can be seen from FIG. 3, the conductivities of the flexible composite thin films prepared in Embodiments 1 and 2 were 1896 S/m and 1319 S/m respectively. It can be seen that the conductivity of the flexible composite thin film gradually decreased with the content of sulfur increased. However, the conductivity of sulfur composite film could still be maintained at a relatively high sulfur content of 70%.

Each of the flexible composite thin films obtained in Embodiments 1 and 2 was cut into a square with an area of 0.6×0.6 cm$^2$ and used as a cathode of the lithium-sulfur battery directly, a lithium metal was served as an anode and the electrolyte was 1 mol·L$^{-1}$ LiTFSI/DOL+DME (the volume ratio of DOL to DME was 1:1) with the addition of 0.1M LiNO$_3$. The separator was a commercial Celegard 2400 polypropylene porous membranes. They were assembled into a 2032 coin cell in a glove box under an inert atmosphere, and the electrochemical performance of the coin cell was tested using an electrochemical workstation (CHI 760E) and a Land battery test system (Wuhan Land Electronic Co., China).

Figure 4:
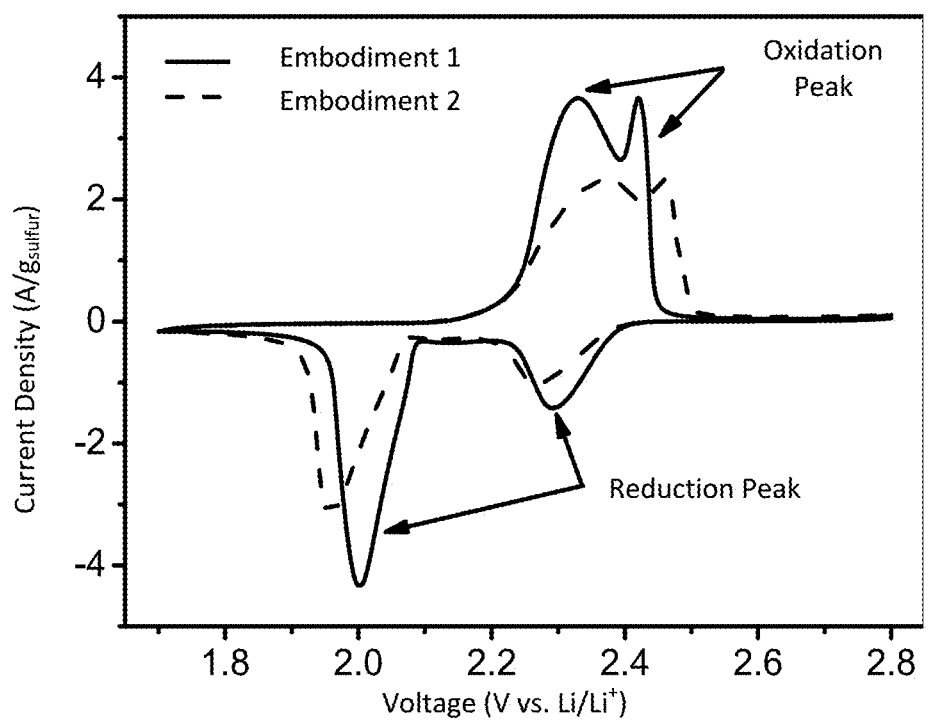
FIG. 4 is a cyclic voltammogram of the flexible sulfur composite films prepared in Embodiments 1 and 2 of the present invention under a scan rate of 0.2 mV/s.

When the flexible composite thin films prepared in Embodiments 1 and 2 were used as cathodes respectively, a cyclic voltammogram at a scan rate of 0.2 mV/s was shown in FIG. 4. As can be seen in FIG. 4, two obvious reduction peaks existed in the vicinity of 2.2-2.3 V and 1.9-2.0 V in the reduction process, which respectively corresponded to a process of converting the elemental sulfur to a polysulfide and a process of converting the polysulfide to lithium sulfide, and in the corresponding oxidation process, a group of overlapped oxidation peaks existed in the vicinity of 2.4-2.6 V, which corresponded to a process of oxidizing the lithium sulfide to lithium polysulfide and further converting it into the elemental sulfur. The obvious reduction and oxidation peaks indicated a good redox reaction of sulfur composite films. With the increase of sulfur content, the potential difference between the oxidation and reduction peaks gradually increased owing to the sluggish reaction kinetics of the electrode at high sulfur content.

Figure 5:
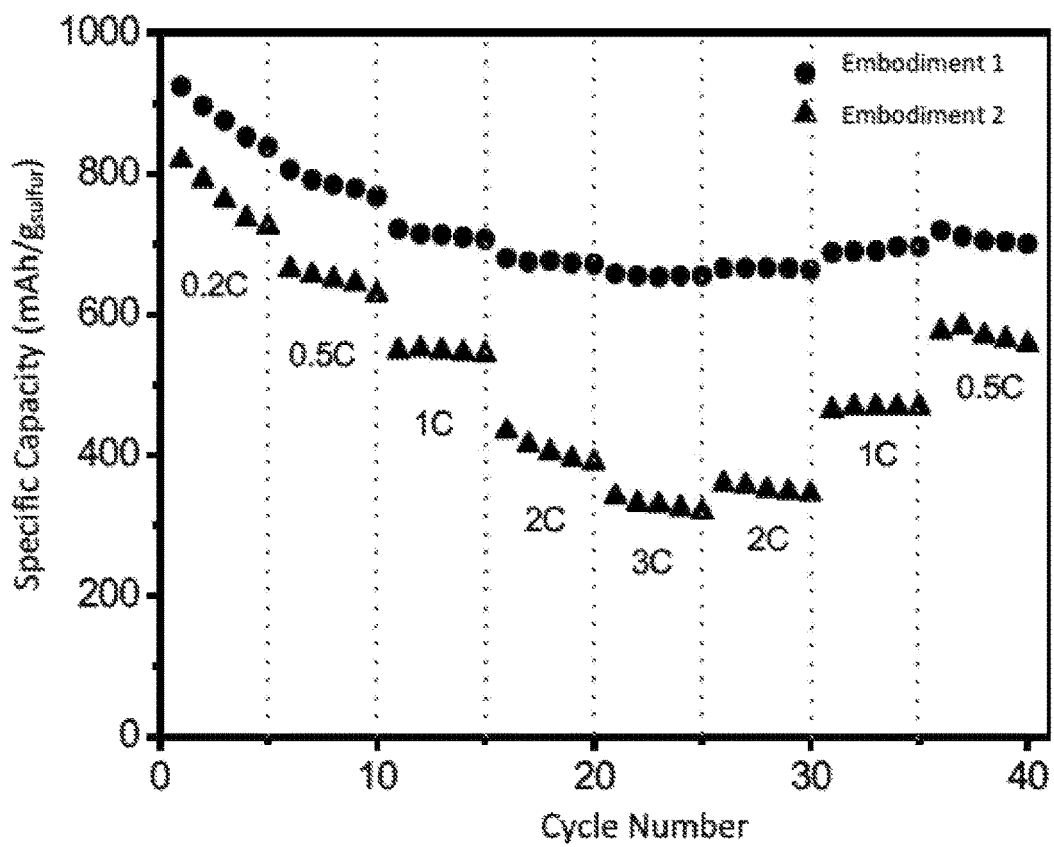
FIG. 5 shows a rate capability of the flexible sulfur composite films prepared in Embodiments 1 and 2 of the present invention.

The rate performance of the flexible sulfur composite thin films prepared in Embodiments 1 and 2 was shown in FIG. 5. As can be seen in FIG. 5, the flexible sulfur composite thin films prepared in Embodiments 1 and 2 respectively exhibited initial capacities of 924.2 mAh/g and 819.6 mAh/g at a rate of 0.2 C, and their capacities also exhibited 657.3 mAh/g and 311 mAh/g at a rate of 3 C respectively. The good electrochemical performance indicates the structure of uniform sulfur layer on the carbon nanotube surface could improve the conductivity and utilization rate of sulfur effectively.

Figure 6:
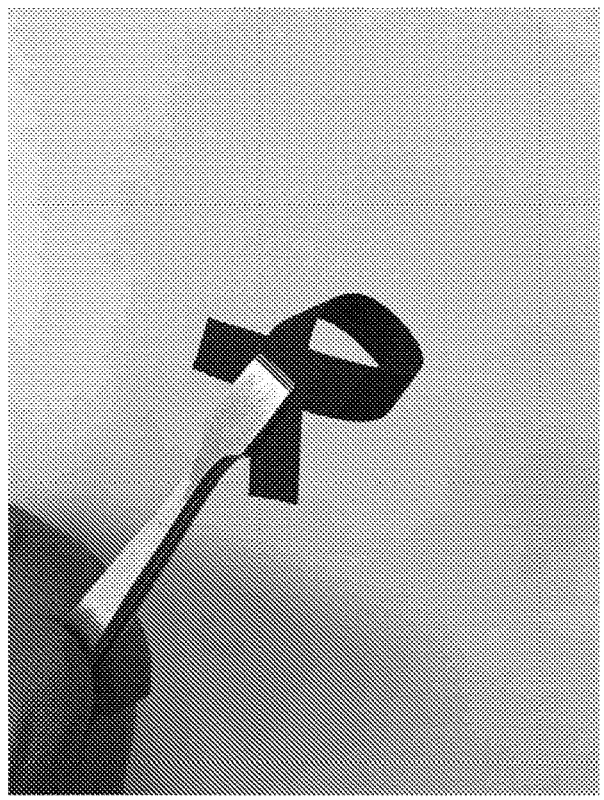
FIG. 6 is a photograph showing a bending effect of the flexible sulfur composite film prepared in Embodiment 1 of the present invention.

The flexible composite thin film prepared in Embodiment 1 was subjected to a flexibility test, and the bending state photo was shown in FIG. 6. As can be seen from FIG. 6, the flexible composite thin film had a good flexibility.

Figure 7:
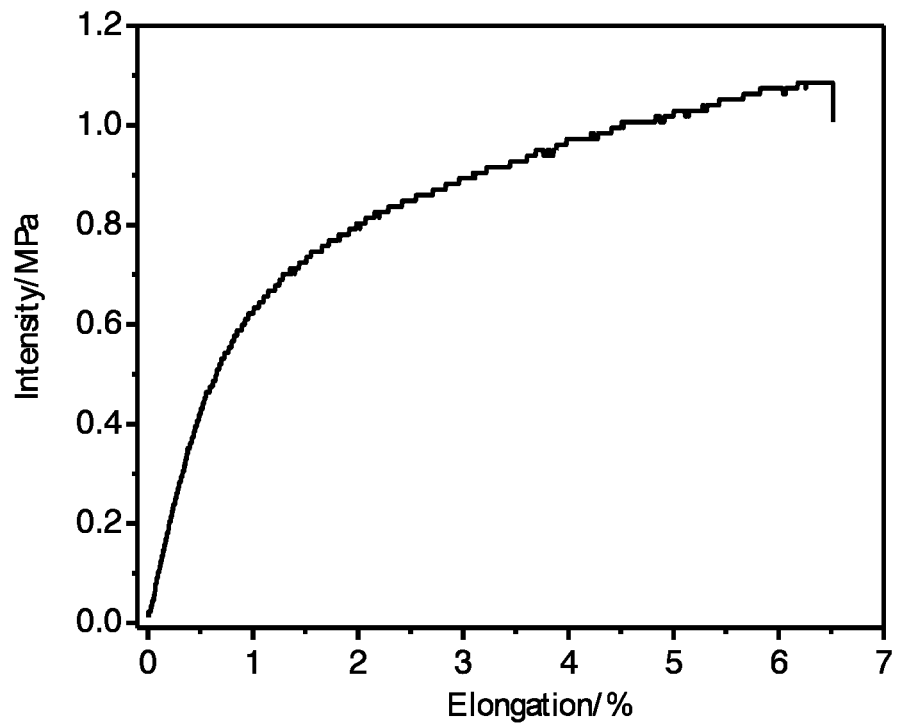
FIG. 7 shows a stress-strain curve of the flexible sulfur composite film prepared in Embodiment 1 of the present invention.

According to an ASTM D638 standard, the flexible composite thin film prepared in Embodiment 1 was subjected to a test for tensile properties, and the stress strain curve was as shown in FIG. 7. As can be seen from FIG. 7, the flexible composite thin film obtained in Embodiment 1 had a breaking strength and a breakage elongation respectively of 1.08 MPa and 6.5%, and a Young's modulus of 93.5 MPa, indicating that the material has a good mechanical property.

Figure 8:
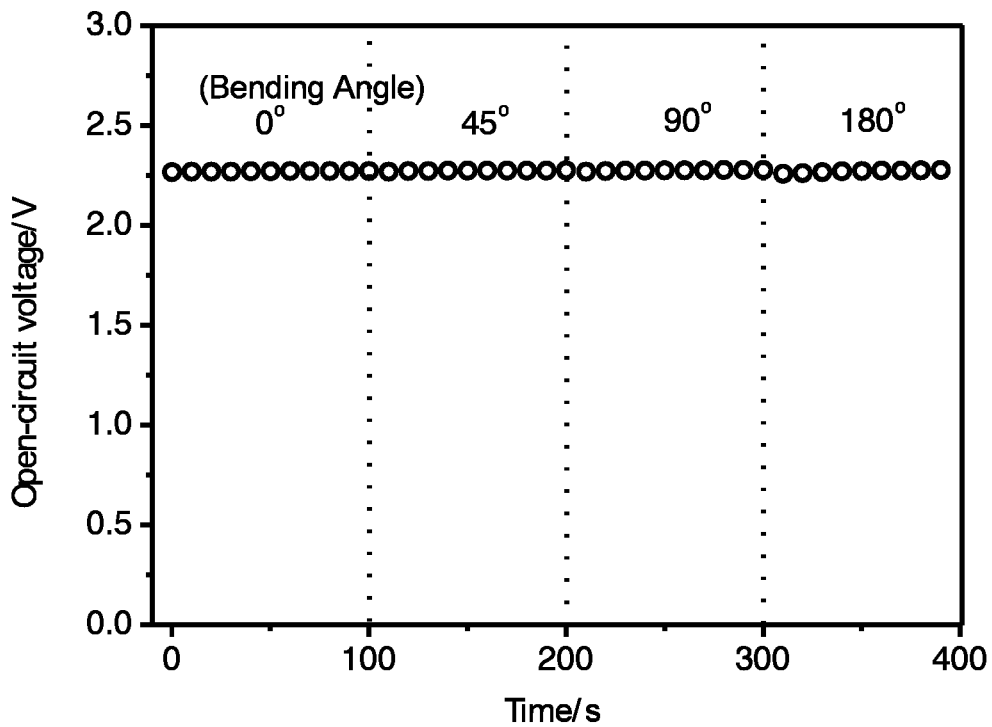
FIG. 8 shows an open-circuit voltage of a flexible lithium sulfur pouch cell under a bending angle after the device is assembled from the flexible sulfur composite film prepared in Embodiment 1 of the present invention as a cathode material.

The flexible thin film prepared in Embodiment 1 was used to assemble the flexible lithium-sulfur battery. A lithium metal served as an anode and an aluminum-plastic film served as a packaging material. The open-circuit voltage of the device along with the change in the bending angle was studied, as shown in FIG. 8. At different bending angles, the open-circuit voltage of the device was remained substantially unchanged, indicating that the flexible thin film could be applied to a flexible battery.

Embodiment 3

0.8 g of sublimed sulfur was ultrasonically dispersed in 150 mL of acetone at 40 kHz for 10 min to enable the dissolution-precipitation process of sulfur to reach an equilibrium state, so as to obtain a sulfur-containing suspension; 0.2 g of a single-walled carbon nanotube (SWCNT) was then added into the sulfur-containing suspension, and the ultrasonic dispersion was continued for 30 min; and then the suspension was poured into a glass culture dish, and the solvent was volatilized completely in 300 min at room temperature to obtain a flexible composite thin film as the sulfur composite cathode film.

Figure 9:
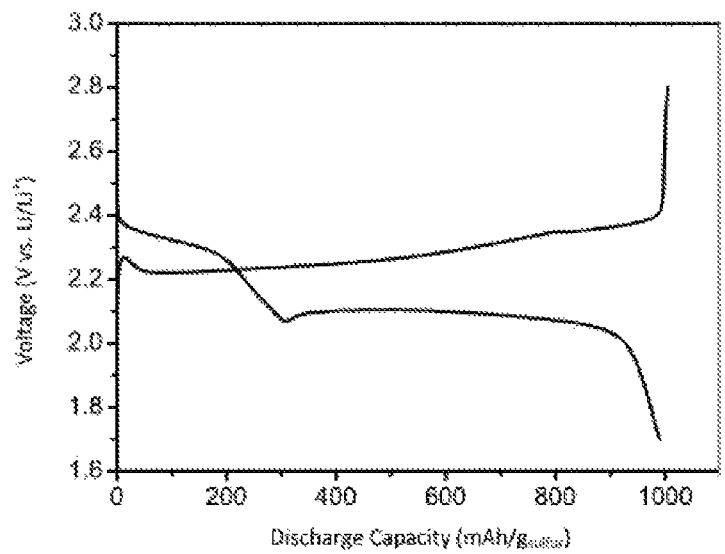
FIG. 9 shows a charge and discharge curve of the flexible sulfur composite film prepared in Embodiment 3 of the present invention at a current density of 0.2 C (335 mA/$g_{sulfur}$)

By using the flexible thin film obtained in Example 3 as a cathode and a lithium metal as an anode, a coin cell was assembled to test its charge and discharge performance, as shown in FIG. 9. At a current density of 0.2 C (335 mA/$g_{sulfur}$), the electrode exhibited a discharge capacity of 989.4 mAh/g, which indicated the high utilization rate of the active material sulfur by the composite electrode at a high sulfur content (80 wt %).

Embodiment 4

0.6 g of nano-sulfur was ultrasonically dispersed in 150 mL of acetone at 40 kHz for 10 min to enable the dissolution-precipitation process of sulfur to reach an equilibrium state, so as to obtain a sulfur-containing suspension; 0.3 g of a commercial activated carbon YP80 was then added into the sulfur-containing suspension, and the ultrasonic dispersion was continued for 30 min; and then the suspension was poured into a glass culture dish, and the solvent was volatilized completely in 300 min at room temperature, and the resultant complex was heated in a tube furnace at 200° C. under a nitrogen atmosphere for 2 h to remove sulfur not adhered onto the YP80 matrix and thus obtain the sulfur composite cathode material, where the mass percentage content of sulfur was 57%, and the mass percentage content of the activated carbon was 43%.

Comparative Embodiment 1

0.6 g of the nano-sulfur was mixed with 0.3 g of the commercial activated carbon YP80 in a ball mill for 30 min, then the premixed composite was heated in a sealed reacting kettle at 155° C. for 24 h, and the resultant sulfur-carbon composite was continually heated in a tube furnace at 200° C. under a nitrogen atmosphere for 2 h to remove the residual sulfur on the surface of the activated carbon, so as to finally obtain a sulfur composite material with a sulfur content of 58.7%.

Figure 10:
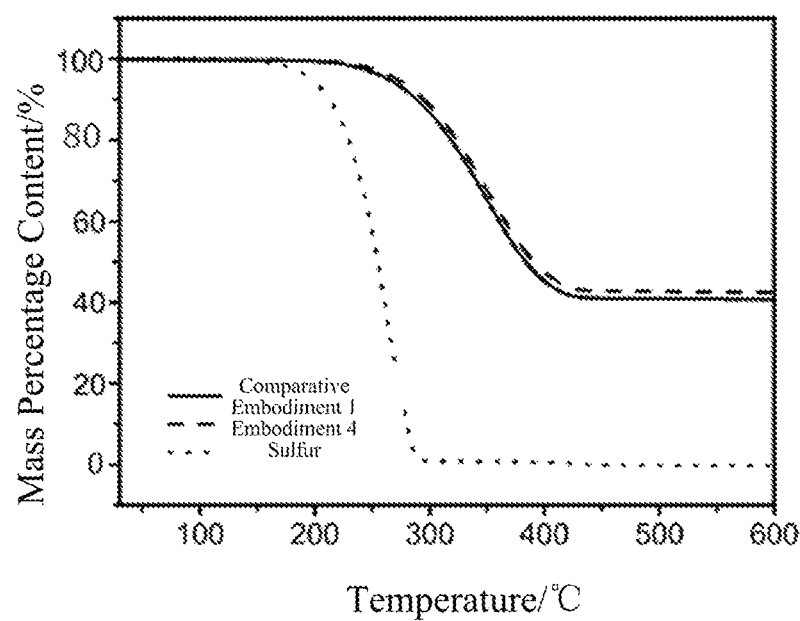
FIG. 10 is thermogravimetric curves of sulfur composites prepared in Embodiment 4 and Comparative Embodiment 1 of the present invention and a sublimed sulfur.

The Comparative Embodiment 1 prepared a sulfur composite material by adopting a conventional melt infiltration method. The elemental sulfur and sulfur composite materials prepared in Embodiment 4 and the Comparative Embodiment 1 were respectively subjected to a thermogravimetric property analysis, and the thermogravimetric curves were shown in FIG. 10. As can be seen from FIG. 10, the thermogravimetric curves of the sulfur composite materials prepared in Embodiment 4 and Comparative Embodiment 1 had similar trends, and high coincidence degree, and exhibited similar sulfur amounts of 57% and 58.7% respectively. As compared with the thermogravimetric curve of the elemental sulfur, the weight loss temperature of the YP80/5 composite material significantly increase indicating thermal stability was significantly improved after the sulfur is complexed with the commercial activated carbon YP80. The result further demonstrated the strong interaction between the elemental sulfur and the host carbon material.

Figure 11:
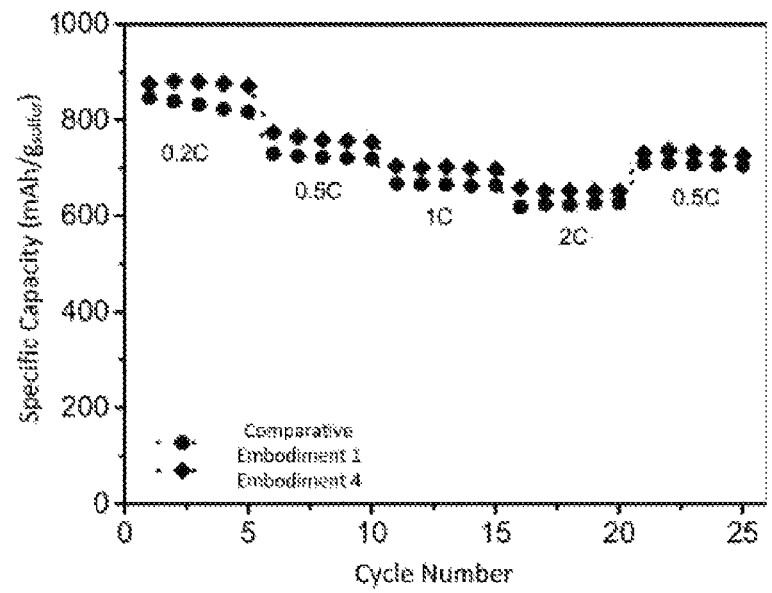
FIG. 11 shows discharge capacities of the sulfur composites prepared in Embodiment 4 and Comparative Embodiment 1 of the present invention at different current densities.

The sulfur composite cathode materials prepared in Embodiment 4 and Comparative Embodiment 1 were respectively mixed uniformly with a conductive carbon black and polyvinylidene fluoride (PVDF) at a mass ratio of 8:1:1 in N-methylpyrrolidone (NMP), the resultant slurry was coated on an aluminum foil and vacuum-dried at 50° C. for 24 h. The resultant coated body was punched into a 12-mm diameter disc serving as the cathode of the lithium-sulfur battery and the lithium metal served as a negative electrode. The electrolyte is 1 mol·L$^{-1}$ of LiTFSI/DOL+DME (the volume ratio of DOL to DME is 1:1) with the addition of 0.1M LiNO$_3$. The commercial Celegard 2400 polypropylene porous membrane was used as the separator between cathode and anode. They were assembled into a 2032 button cell in a glove box under an inert atmosphere. The rate performances of the coin cell at different current densities were tested using a battery testing system in a voltage range of 1.7-2.8 V, and the results were shown in FIG. 11. It can be seen from FIG. 11 that, the sulfur composite cathode materials prepared in Embodiment 4 and Comparative Embodiment 1 exhibited similar capacities and rate performances at different current densities, indicating that the preparation method of the present invention could effectively replace the conventional melt infiltration method to prepare the sulfur composite cathode material. This experiment with simple operation could be carried out at a room-temperature environment and had low energy consumption indicating a broad application prospects.

Embodiment 5

0.1 g of polyvinyl acetate (PVAc, Mw of about 500,000) was dissolved in 150 ml of acetone and stirred magnetically for 10 min. After the PVAc was completely dissolved, 0.6 g of nano-sulfur was added and ultrasonically dispersed at a frequency of 40 kHz for 10 min to enable the dissolution-precipitation process of sulfur to reach an equilibrium state, so as to obtain a sulfur-containing suspension; 0.3 g of a multi-walled carbon nano-tube (CNT) was then added into the sulfur-containing suspension, and the ultrasonic dispersion was continued for 30 min; and then the suspension was poured into a glass culture dish. After the solvent volatilized completely in 300 min at room temperature, a flexible composite thin film as the sulfur composite cathode material was obtained. The mass percentage content of sulfur, multi-walled carbon nano-tube and polyvinyl acetate were 60%, 30% and 10%, respectively.

Embodiment 6

0.1 g of polyvinyl acetate (PVAc, Mw of about 100,000) was dissolved in 150 ml of acetone and stirred magnetically for 10 min. After the PVAc was completely dissolved, 0.6 g of nano-sulfur was added and ultrasonically dispersed at a frequency of 40 kHz for 10 min to enable the dissolution-precipitation process of sulfur to reach an equilibrium state, so as to obtain a sulfur-containing suspension; 0.3 g of a multi-walled carbon nano-tube (CNT) was then added into the sulfur-containing suspension, and the ultrasonic dispersion was continued for 30 min; and then the suspension was poured into a glass culture dish. After the solvent volatilized completely in 300 min at room temperature, a flexible composite thin film as the sulfur composite cathode material was obtained. The mass percentage content of sulfur, multi-walled carbon nano-tube and polyvinyl acetate were 60%, 30% and 10%, respectively.

Embodiment 7

0.6 g of nano-sulfur was ultrasonically dispersed in 150 mL of acetone at 40 kHz for 10 min to enable the dissolution-precipitation process of sulfur to reach an equilibrium state, so as to obtain a sulfur-containing suspension; 0.3 g of a multi-walled carbon nano-tube (CNT) was then added into the sulfur-containing suspension, and the ultrasonic dispersion was continued for 30 min; and then the suspension was poured into a glass culture dish. After the solvent volatilized completely in 300 min at room temperature, a flexible composite thin film as the sulfur composite cathode material was obtained. The mass percentage content of sulfur and multi-walled carbon nano-tube were 66.7% and 33.3%, respectively.

Figure 12:
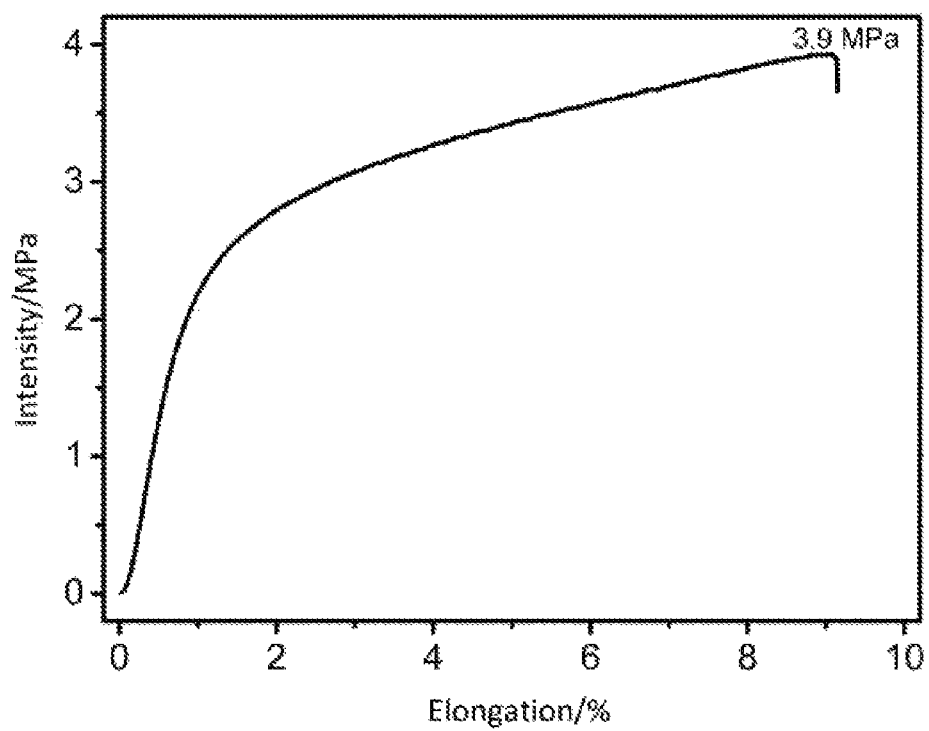
FIG. 12 shows a stress-strain curve of a flexible sulfur composite film prepared in Embodiment 5 of the present invention.
Figure 13:
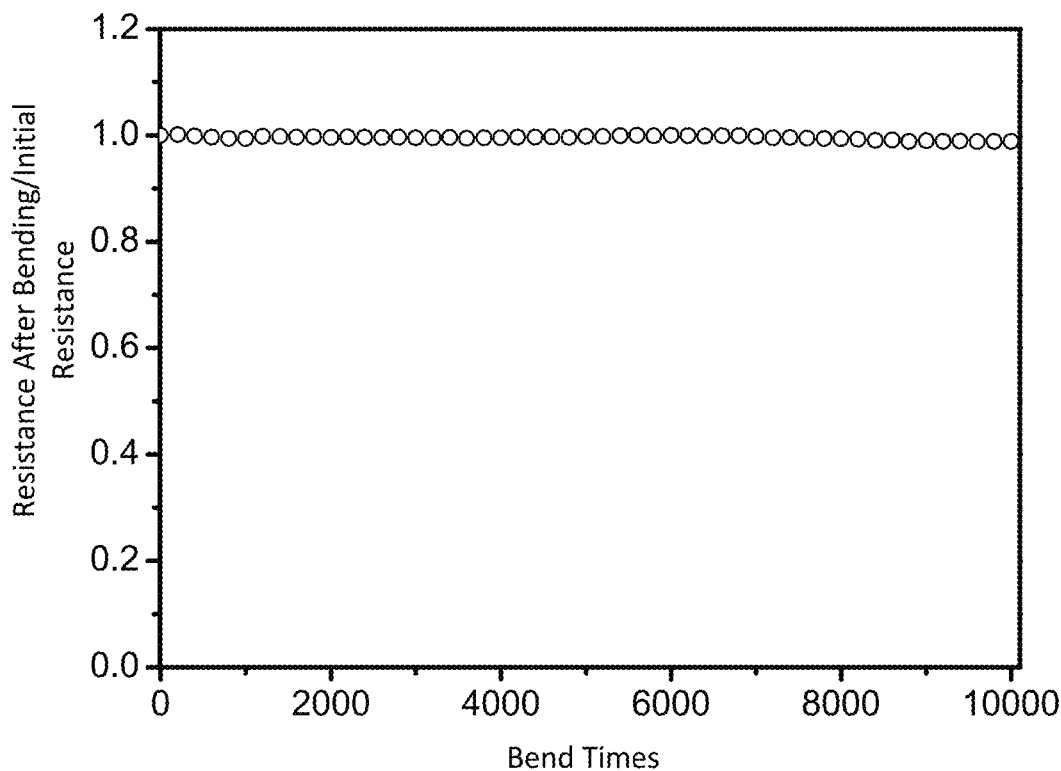
FIG. 13 shows a resistance variation of the flexible sulfur composite film prepared in Embodiment 5 of the present invention during a repeated deformation process.

According to an ASTM D638 standard, the flexible composite thin film prepared in Embodiment 5 was subjected to a test for tensile properties, and the stress strain curve was as shown in FIG. 12. As can be seen from FIG. 12, the flexible composite thin film obtained in Embodiment 5 had a breaking strength and a breakage elongation respectively of 3.9 MPa and 9.1%, and a Young's modulus of 306 MPa, demonstrating that the material has a good mechanical property. Thereafter, the deformation resistance performance of the sample of Embodiment 5 was studied, and it was found that the resistance of the thin film was remained unchanged after 10,000 times of bending (as shown in FIG. 13), indicating that the material had a great deformation resistance. As compared with the mechanical properties of the sample in which no polymer was added (as shown in FIG. 7), the mechanical properties of the material were further improved by the addition of polymer.

Figure 14:
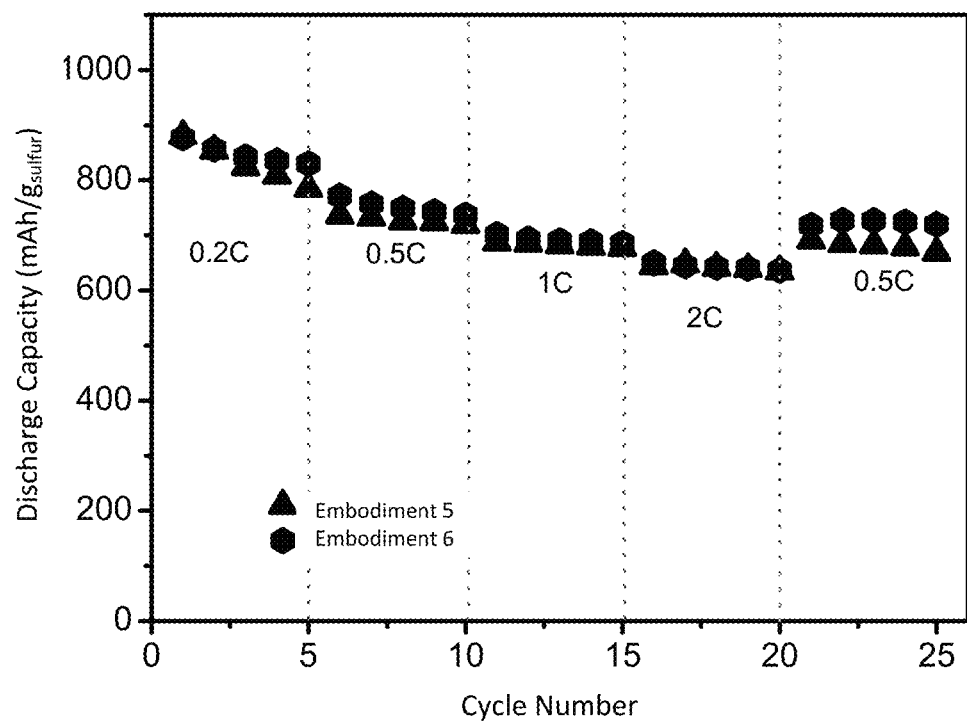
FIG. 14 shows a rate capability of the flexible sulfur composite films prepared in Embodiments 5 and 6 of the present invention.

The sulfur composite cathode materials prepared in Embodiments 5 and 6 were all assembled into button batteries to test their electrochemical rate characteristics, as shown in FIG. 14. As can be seen from FIG. 14, the resultant test cells exhibited similar initial capacities of 880.5 mAh/g and 876.9 mAh/g at a rate of 0.2 C. When the rate was increased to 2 C, the capacity retention rates were 73.1% and 74.1% respectively. This result showed that a sulfur composite cathode material with excellent electrochemical rate characteristics can be obtained by using polyvinyl acetate with different molecular weights.

Figure 15:
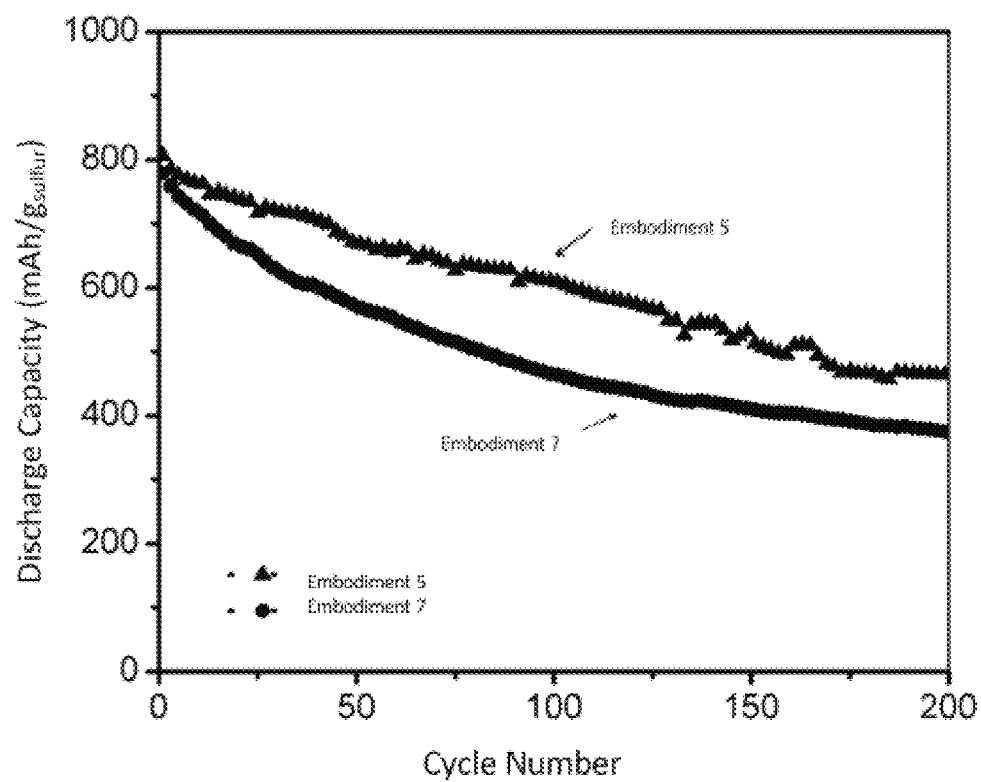
FIG. 15 shows the stability of flexible sulfur composite films prepared in Embodiments 5 and 7 of the present invention at 0.5 C.

The sulfur composite cathode materials prepared in Embodiments 5 and 7 were assembled into coin cells to test their cycling stability at 0.5 C, and the results were shown in FIG. 15. As can be seen from FIG. 15, after 200 cycles, the capacity retention of the test cells were 57.3% and 48.0% respectively. It can be seen that the addition of the polymer material can effectively improve the cycling stability of the electrode.

Figure 16:
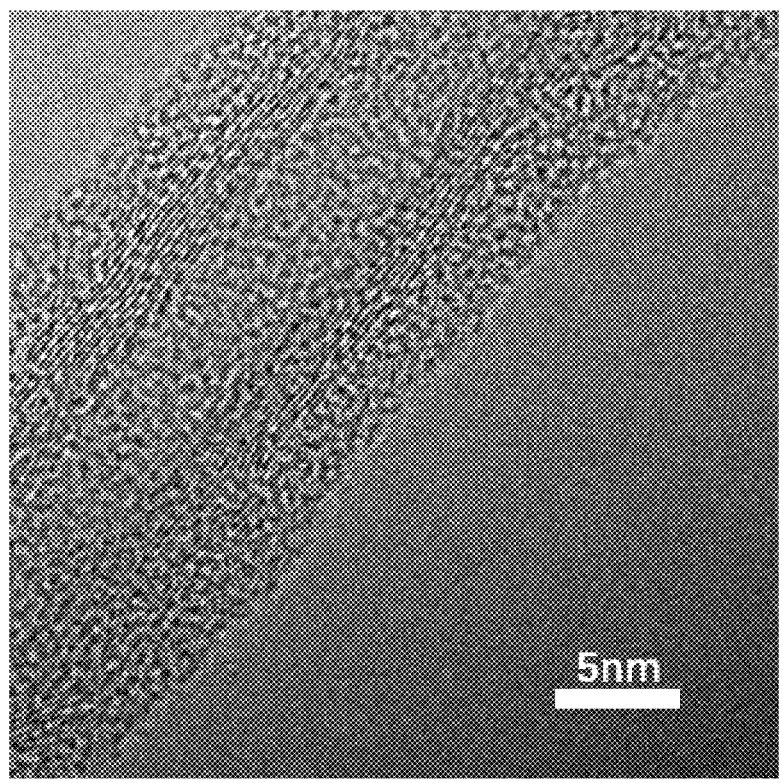
FIG. 16 is a transmission electron micrograph of the flexible sulfur composite films prepared in Embodiment 5 of the present invention.

The material obtained in Embodiment 5 was characterized using a transmission electron microscope, as shown in FIG. 16. From this figure it could be observed that there is a uniform coating on the surface of the carbon nano-tube.

Embodiment 8

0.6 g of nano-sulfur was ultrasonically dispersed in 150 mL of acetone at 40 kHz for 10 min to obtain a sulfur-containing suspension; 0.4 g of a graphene was then added into the sulfur-containing suspension, and the ultrasonic dispersion was continued for 30 min; and then the suspension was poured into a glass culture dish. After the solvent volatilized completely in 300 min at room temperature, a flexible composite thin film as the sulfur composite cathode material was achieved. The mass percentage content of sulfur and graphene were 60% and 40%, respectively.

Figure 17:
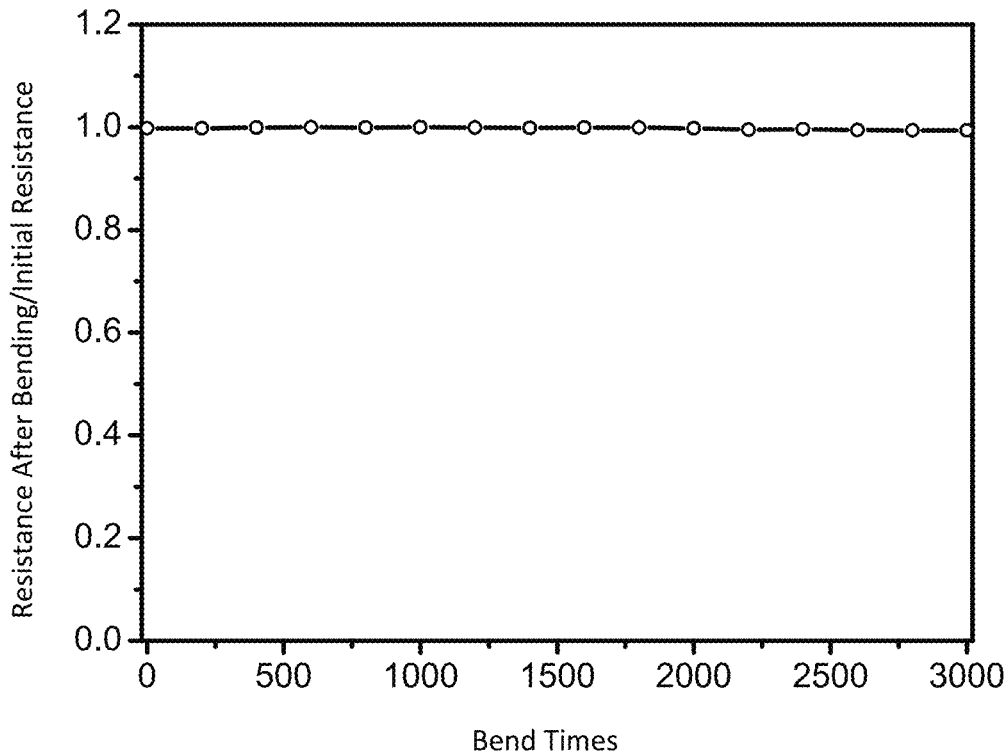
FIG. 17 shows a change in resistance of the flexible sulfur composite film prepared in Embodiment 8 of the present invention during a deformation process.

As shown in FIG. 17, after 3000 times of bending, the resistance of flexible thin film obtained in Embodiment 8 exhibited no significant change indicating the electrode had a great deformation resistance and graphene is an ideal host material to fabricate the flexible cathode of lithium-sulfur battery.

Embodiment 9

0.6 g of nano-sulfur was ultrasonically dispersed in 150 mL of acetone at 40 kHz for 10 min to obtain a sulfur-containing suspension; 0.3 g of a multi-walled carbon nano-tube was then added into the sulfur-containing suspension, and the ultrasonic dispersion was continued for 30 min. After the solvent volatilized completely in 300 min at room temperature, a sulfur/carbon nanotube composite material was complexed uniformly. 0.1 g of polyacrylic acid was dissolved in 100 mL of water, and 0.9 g of the sulfur/carbon nanotube composite material was sonicated in the aqueous solution of polyacrylic acid for 30 min. The resultant uniform suspension was poured into a glass culture dish, and the solvent volatilized completely at 50° C. in 180 min to obtain the flexible composite thin film. The mass percentage contents of sulfur, carbon nanotube and polyacrylic acid were 60%, 30%, and 10%, respectively.

Figure 18:
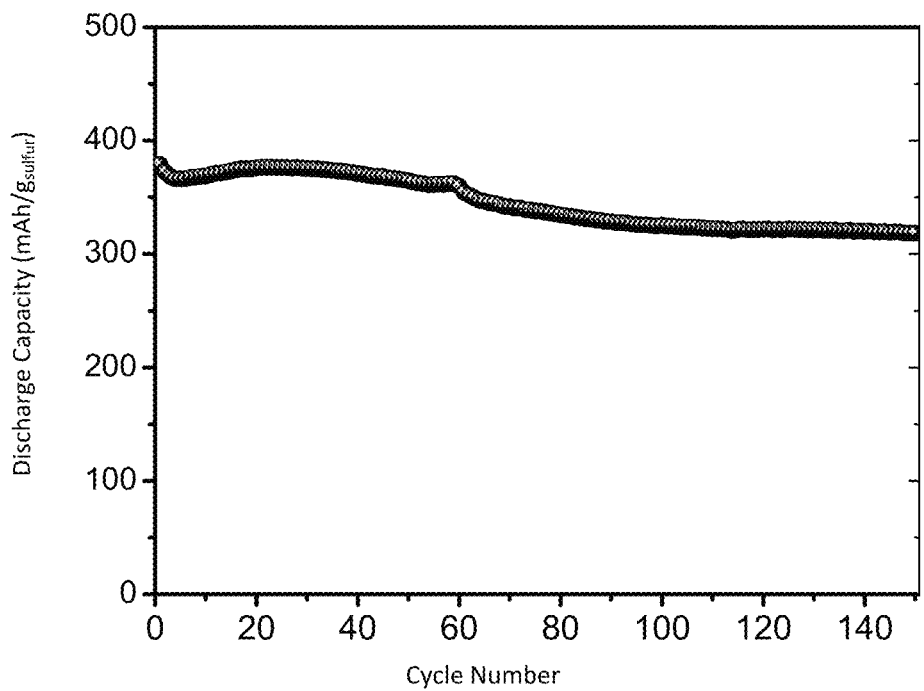
FIG. 18 shows the cycling stability of a flexible composite electrode prepared in Embodiment 9 of the present invention at a current density of 1 C.

As shown in FIG. 18, the flexible composite electrode prepared in Embodiment 9 showed the capacity retention of 84% after 150 cycles at a rate of 1 C, indicating great cycling stability of the electrode.

Embodiment 10

Figure 19:
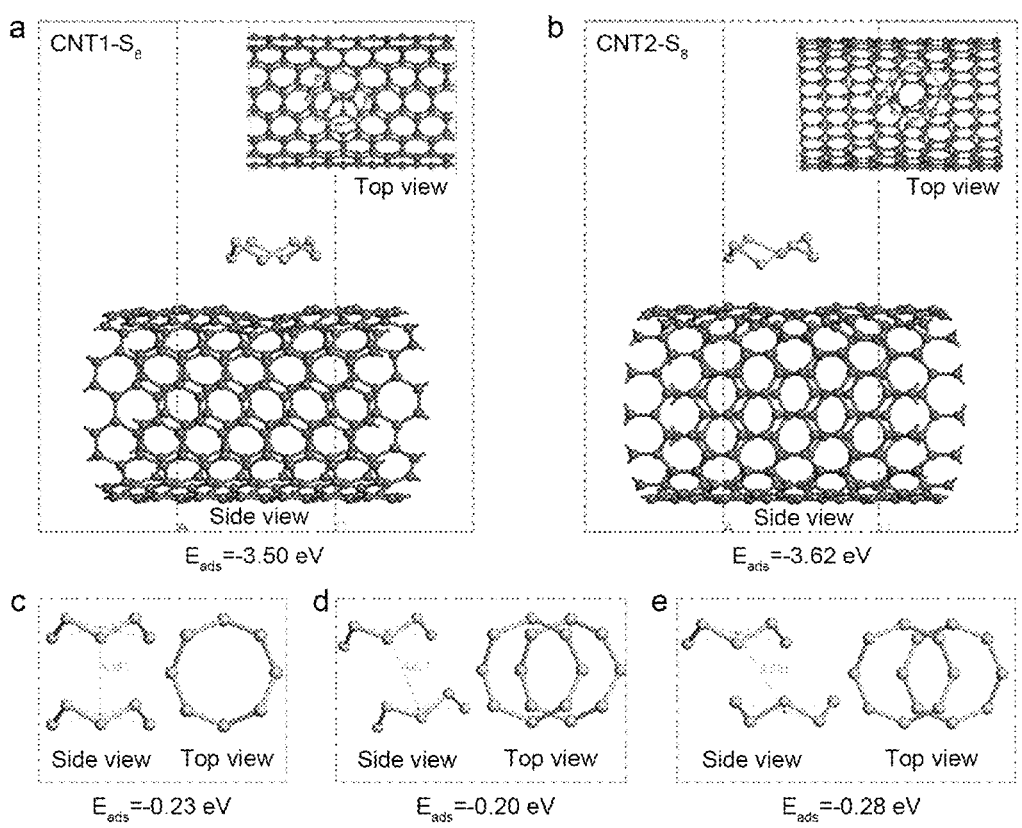
FIG. 19 shows stable adsorption configurations of $S_8$ molecule-carbon nanotube and $S_8$ molecule-$S_8$ molecule in the theoretical calculation of Embodiment 10 of the present invention.

We used the $S_8$ molecule and the carbon nano-tube with a defect as research objects. The adsorption energy between the $S_8$ molecule and carbon nanotube was performed using a VASP package with generalized gradient approximation (GGA). Two carbon nano-tube models, i.e., CNT (8,8) and CNT (14,0), were selected as representatives. As shown in FIG. 19, FIG. 19-$a$ shows a stable adsorption configuration (CNT1-$S_8$) formed by the $S_8$ molecule on the surface of the CNT (8,8) with the adsorption energy of −3.50 eV. FIG. 19-$b$ shows a stable adsorption configuration (CNT2-$S_8$) formed by the $S_8$ molecule adsorbed onto to the surface of the CNT (14,0) with the adsorption energy of −3.62 eV. FIGS. 19-$c$, 19-$d$, and 19-$e$ showed possible configurations formed by absorption between a $S_8$ molecule and another $S_8$ molecule, with the possible adsorption energies of −0.23, −0.20, and −0.28 eV respectively. It can be seen that the adsorption energy of the $S_8$ molecule onto the surfaces of the CNT (8,8) and CNT (14,0) is much smaller than the adsorption energy between a $S_8$ molecule and another $S_8$ molecule (−0.2-−0.3 eV), indicating that the $S_8$ molecule tends to be adsorbed onto the surface of the carbon nanotube, which theoretically proves the occurrence of a phase transfer process in a solution.

The results of the above embodiments show that the method provided by the present invention is simple and has strong operability. The prepared sulfur composite cathode material has excellent energy storage performance, and the elemental sulfur is uniformly complex with the conductive host material to exhibit good conductivity, thereby ensuring effective utilization of the active ingredient sulfur to enable the material to exhibit a high initial capacity and good rate performance. When the carbon nanotube is used as a host material, the sulfur composite thin film obtained by self-weaving of the carbon nanotube has good mechanical properties, and has great application prospects in the aspect of flexible lithium-sulfur battery.

The foregoing descriptions are only preferred implementation manners of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. A method for preparing a sulfur composite cathode material, comprising the following steps:
   (1) mixing an elemental sulfur with an organic solvent to obtain a sulfur-containing suspension, wherein the sulfur-containing suspension comprises a saturated solution of sulfur and an undissolved elemental sulfur; and
   (2) mixing the sulfur-containing suspension obtained in step (1) with a host material, the adsorption between the host material and the dissolved elemental sulfur occurs during the mixing process of the sulfur-containing suspension and the host material; the elemental sulfur dissolved in the organic solvent exists in the form of a $S_8$ molecule, and the elemental sulfur is deposited on the surface of the host material due to the strong interaction between the host material and the dissolved elemental sulfur; the surface energy of the host material is reduced after $S_8$ is adsorbed on the surface of the host material, and the surface energy of the $S_8$ adsorbed on the surface of the host material is relatively higher; owing to the high surface energy, S8 molecule continuously deposited and formed a uniform sulfur coating on the surface of the host material; as the $S_8$ molecule is continuously adsorbed by the host material, the concentration of the sulfur dissolved in the organic solvent is continuously reduced; the unsaturation degree of the solution drives rapid dissolution of the originally undissolved elemental sulfur particles; with the dissolution-recrystallization balance of sulfur in the organic solvent, the large sulfur particles are transformed into a uniform sulfur coating on the surface of the host material; and
   removing the organic solvent, to obtain a sulfur composite cathode material;
   wherein the time of mixing the sulfur-containing suspension and the host material depends on a criterion that there the disappearance of undissolved elemental sulfur particles indicates the complete mixture of the sulfur-containing suspension and the host material; wherein the host material comprises a carbon material; and
   the mass ratio of the elemental sulfur used in step (1) for formulating the sulfur-containing suspension to the host material in step (2) is (10-85):(15-90).

2. The method of claim 1, wherein the method further comprises adding an oxygen-containing functional polymer material when the sulfur-containing suspension and the host material are mixed in step (2).

3. The method of claim 2, wherein the carbon material comprises one or more of a carbon nano-tube, a graphene, a porous carbon, a carbon black, and a carbon fiber.

4. The method of claim 1, wherein the carbon material comprises one or more of carbon nano-tube, graphene, porous carbon, carbon black, and carbon fiber.

5. The method of claim 1, wherein the mass ratio of the elemental sulfur to the organic solvent in step (1) is 1:(10-300).

6. The method of claim 5, wherein the organic solvent comprises one or more of ethanol, diethyl ether, acetone, tetrahydrofuran, xylene, ethyl acetate, N,N-dimethylformamide, and dimethyl sulfoxide.

7. The method of claim 5, wherein the elemental sulfur comprises one or more of rhombic sulfur, orthogonal sulfur, amorphous sulfur, sublimed sulfur, and nano-sulfur.

8. The method of claim 1, wherein the elemental sulfur comprises one or more of rhombic sulfur, orthogonal sulfur, amorphous sulfur, sublimed sulfur, and nano-sulfur.

9. The method of claim 1, wherein the organic solvent comprises one or more of ethanol, diethyl ether, acetone, tetrahydrofuran, xylene, ethyl acetate, N,N-dimethylformamide, and dimethyl sulfoxide.

10. The method of claim 1, wherein the time of mixing the sulfur-containing suspension and the host material in step (2) is 5-30 min; and
    the approach of mixing the sulfur-containing suspension and the host material in step (2) is ball milling, ultrasonic dispersion, mechanical stirring, or mechanical stirring under an ultrasonic condition.

11. The method of claim 1, wherein the removal approach of the organic solvent in step (2) is natural volatilization, volatilization by heating, filtration or suction filtration.

12. The method of claim 1, wherein application of the sulfur composite cathode material obtained by the method of claim 1 is as a cathode material of a lithium-sulfur battery; the elemental sulfur in the sulfur composite material is carried on the surface of the host material in the form of S8 molecule, and is connected by a Van Der Waal's force between the host material and the S8 molecule.

13. A sulfur composite cathode material obtained by the method of claim 1, by mass percentage content comprising 15-90% of the host material and 10-85% of the elemental sulfur carried on the surface of the host material; the elemental sulfur in the sulfur composite material is carried on the surface of the host material in the form of $S_8$ molecule, and is connected by a Van Der Waal's force between the host material and the $S_8$ molecule.

* * * * *